United States Patent
Murakawa et al.

(10) Patent No.: US 11,270,506 B2
(45) Date of Patent: *Mar. 8, 2022

(54) FOVEATED GEOMETRY TESSELLATION

(71) Applicant: Sony Interactive Entertainment Inc., Tokyo (JP)

(72) Inventors: Jun Murakawa, Foster City, CA (US); John Doolittle, San Mateo, CA (US); Justin Beck, San Bruno, CA (US); Brendan Rehon, San Mateo, CA (US); Michael Thomas Kutner, Mountain View, CA (US)

(73) Assignee: SONY COMPUTER ENTERTAINMENT INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/908,350

(22) Filed: Jun. 22, 2020

(65) Prior Publication Data

US 2020/0320787 A1    Oct. 8, 2020

Related U.S. Application Data

(63) Continuation of application No. 14/927,157, filed on Oct. 29, 2015, now Pat. No. 10,726,619.

(51) Int. Cl.
*G06T 17/20* (2006.01)
*G06T 15/20* (2011.01)
(Continued)

(52) U.S. Cl.
CPC .............. *G06T 17/20* (2013.01); *G06T 11/40* (2013.01); *G06T 15/005* (2013.01); *G06T 15/20* (2013.01); *G06T 19/20* (2013.01); *G06T 2210/36* (2013.01)

(58) Field of Classification Search
CPC ......... G06T 17/20; G06T 15/20; G06T 11/40; G06T 15/005; G06T 19/20; G06T 2210/36; G06T 15/205
See application file for complete search history.

(56) References Cited

U.S. PATENT DOCUMENTS 6,137,492 A    10/2000 Hoppe
6,940,505 B1    9/2005 Savine et al.
(Continued)

FOREIGN PATENT DOCUMENTS

| JP | 2003288609 A | 10/2003 |
| JP | 2013201720 | 3/2015 |
| WO | 2015153169 A1 | 10/2015 |

OTHER PUBLICATIONS

Brian Guenter et al Foveated 3D Graphics, ACM Transactions on Graphics, vol. 31, No. 6, Nov. 1, 2012 (Nov. 1, 2012), XP055199808, ISSN: 0730-0301, DOI: 10.1145/2366145.2366183, p. 1-p. 9.
(Continued)

*Primary Examiner* — William A Beutel
(74) *Attorney, Agent, or Firm* — JDI Patent; Joshua Isenberg; Robert Pullman (57) ABSTRACT

In graphics processing data is received representing one or more vertices for a scene in a virtual space. A projection of the vertices onto a screen space of a display device is performed. A density of the vertices is adjusted for selected portions of the screen space, such that a lower density of vertices is present in selected portions of the screen space. Primitive assembly is performed on the vertices to generate a one or more primitives in screen space from the projection of the vertices onto the screen space. A finished frame is then generated by performing pixel processing to assign pixel values to the pixel or pixels that are part of the corresponding primitives. In some implementations, the finished frame (Continued)

can be stored in the memory or displayed on the display device.

23 Claims, 6 Drawing Sheets

(51) Int. Cl.
    *G06T 11/40*     (2006.01)
    *G06T 15/00*     (2011.01)
    *G06T 19/20*     (2011.01)

(56) References Cited

U.S. PATENT DOCUMENTS

| | | | |
|---|---|---|---|
| 9,087,237 | B2 | 7/2015 | Shimizu |
| 2002/0118224 | A1 | 8/2002 | Levanon et al. |
| 2002/0171852 | A1 | 11/2002 | Zhang et al. |
| 2003/0128210 | A1 | 7/2003 | Muffler et al. |
| 2004/0227703 | A1 | 11/2004 | Lamvik et al. |
| 2005/0078116 | A1* | 4/2005 | Sloan ............ G06T 15/55 345/502 |
| 2007/0220525 | A1 | 9/2007 | State et al. |
| 2007/0247458 | A1* | 10/2007 | Surazhsky ........... G06T 17/20 345/423 |
| 2008/0036875 | A1 | 2/2008 | Jones et al. |
| 2009/0295803 | A1 | 12/2009 | Young et al. |
| 2010/0253683 | A1 | 10/2010 | Munkberg et al. |
| 2012/0287163 | A1* | 11/2012 | Djavaherian ........... G09G 5/00 345/667 |
| 2013/0021358 | A1 | 1/2013 | Nordlund et al. |
| 2013/0050432 | A1 | 2/2013 | Perez et al. |
| 2013/0094753 | A1 | 4/2013 | Voss et al. |
| 2013/0106832 | A1 | 5/2013 | Meeker et al. |
| 2013/0156103 | A1 | 6/2013 | Wang et al. |
| 2014/0022264 | A1 | 1/2014 | Shreiner |
| 2014/0247277 | A1* | 9/2014 | Guenter .............. G06T 11/40 345/611 |
| 2014/0347363 | A1 | 11/2014 | Kaburlasos |
| 2014/0347371 | A1 | 11/2014 | Stenson et al. |
| 2014/0347375 | A1 | 11/2014 | Stenson et al. |
| 2015/0085097 | A1 | 3/2015 | Larsen |
| 2015/0085250 | A1 | 3/2015 | Larsen |
| 2015/0085251 | A1 | 3/2015 | Larsen |
| 2015/0287158 | A1 | 10/2015 | Cerny et al. |
| 2015/0287167 | A1 | 10/2015 | Cerny |
| 2015/0287230 | A1 | 10/2015 | Cerny |
| 2016/0131908 | A1 | 5/2016 | Fateh |
| 2016/0274365 | A1 | 9/2016 | Bailey et al. |
| 2017/0124760 | A1 | 5/2017 | Murakawa et al. |

OTHER PUBLICATIONS

David Luebke et al: "Perceptually Driven Simplification for Interactive Rendering" In: "EUROGRAPHICS", Jan. 1, 2001 (Jan. 1, 2001), Springer Verlag, Vienna AT, XP055347713, ISSN: 0946-2767, pp. 223-234, DOI: 10.1007/978-3-7091-6242-2 21, p. 1-p. 12.
Extended European Search Report dated Mar. 21, 2019 for European Patent Application No. 16860636.6.
Final Office Action for U.S. Appl. No. 14/927,157, dated Jul. 25, 2019.
Non-Final Office Action for U.S. Appl. No. 14/927,157, dated Aug. 7, 2018.
International Search Report and Written Opinion for International Application No. PCT/US2016/058718, dated Jan. 25, 2017.
Non-Final Office Action for U.S. Appl. No. 14/927,157, dated Dec. 19, 2019.
Non-Final Office Action for U.S. Appl. No. 14/927,157, dated Mar. 18, 2019.
Notice of Allowance for U.S. Appl. No. 14/927,157, dated Mar. 23, 2020.
Office Action dated Nov. 26, 2019 for Japanese Patent Application No. 2018-518443.
Final Office Action for U.S. Appl. No. 14/927,157, dated Nov. 20, 2018.
Non-Final Office Action for U.S. Appl. No. 14/927,157, dated Sep. 29, 2017.
Final Office Action for U.S. Appl. No. 14/927,157, dated Apr. 20, 2018.
Office Action dated Jun. 2, 2020 for Japanese Patent Application No. 2018-518443.
Office Action dated Mar. 11, 2021 for Chinese Patent Application No. 201680062055.2.
Office Action dated Sep. 29, 2020 for Japanese Patent Application No. 2018-518443.
Office Action dated Nov. 12, 2021 for Chinese Patent Application No. 201680062055.2.

\* cited by examiner

| 1 | 1 | 2 | 2 | 1 | 1 |
|---|---|---|---|---|---|
| 1 | 2 | 3 | 3 | 2 | 1 |
| 2 | 3 | 4 | 4 | 3 | 2 |
| 2 | 3 | 4 | 4 | 3 | 2 |
| 1 | 2 | 3 | 3 | 2 | 1 |
| 1 | 1 | 2 | 2 | 1 | 1 |

FIG. 3A

| 1 | 1 | 1 | 2 | 1 | 1 |
|---|---|---|---|---|---|
| 1 | 2 | 2 | 3 | 2 | 1 |
| 1 | 2 | 3 | 4 | 3 | 2 |
| 1 | 1 | 2 | 3 | 2 | 2 |
| 1 | 2 | 1 | 2 | 2 | 1 |
| 1 | 1 | 1 | 1 | 1 | 1 |

280 (pointing to the 4 in row 3, column 4)

FOVEATED GEOMETRY TESSELLATION

CLAIM OF PRIORITY

This application is a continuation of U.S. patent application Ser. No. 14/927,157 filed Oct. 29, 2015, the entire contents of which are incorporated herein by reference.

FIELD OF THE DISCLOSURE

Aspects of the present disclosure are related to computer graphics. In particular, the present disclosure is related to varying resolution by screen location.

BACKGROUND

In computer graphics, tessellation is used to manage datasets of polygons (sometimes called vertex sets) presenting objects in a scene and divide them into suitable structures for rendering. Typically, three dimensional object data is tessellated into triangles, especially for real-time rendering. A key advantage of tessellation for real-time graphics is that it allows detail to be dynamically added and subtracted from a 3D mesh and its silhouette edges based on control parameters, such as camera distance.

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, tablet computers, portable game devices, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send the GPU instructions, commonly referred to as draw commands, that instruct the GPU to implement a particular graphics processing task, e.g., render a particular texture that has changed with respect to a previous frame in an image. These draw commands may be coordinated by the CPU with a graphics application programming interface (API) in order to issue graphics rendering commands that correspond to the state of the particular application's virtual environment.

In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data suitable for output display, and additional rendering tasks on the pixels (or fragments) before outputting the rendered image on a display.

Virtual objects of an image are often described in virtual space in terms of shapes known as primitives, which together make the shapes of the objects in the virtual scene. For example, objects in a three-dimensional virtual world to be rendered may be reduced to a series of distinct triangle primitives having vertices defined in terms of their coordinates in three-dimensional space, whereby these polygons make up the surfaces of the objects. Each polygon may have an associated index that can be used by the graphics processing system to distinguish a given polygon from other polygons. Likewise, each vertex may have an associated index that can be used to distinguish a given vertex from other vertices. A graphics pipeline may perform certain operations on these primitives to produce visuals for the virtual scene and transform this data into a two-dimensional format suitable for reproduction by the pixels of the display. The term graphics primitive information (or simply "primitive information"), as used herein, is used to refer to data representative of a graphics primitive. Such data includes, but is not limited to, vertex information (e.g., data representing vertex positions or vertex indices) and polygon information, e.g., polygon indices and other information that associates particular vertices with particular polygons.

In existing surface subdivision software, e.g., opens source software such as OpenSubdiv, or geometry tessellation in general, geometric primitives make that up a surface and that are consumed by a tessellation unit are sometimes called "patches". In that context, the term "polygon" or simply "triangle" is commonly used for the output of a tessellation operation and the input for subsequent processing.

As part of the graphics pipeline, the GPU may perform rendering tasks by implementing programs commonly known as shaders. A typical graphics pipeline may include vertex shaders, which may manipulate certain properties of the primitives on a per-vertex basis, as well as pixel shaders (also known as "fragment shaders"), which operate downstream from the vertex shaders in the graphics pipeline and may manipulate certain values on a per-pixel basis before transmitting the pixel data to a display. The fragment shaders may manipulate values relevant to applying textures to primitives. The pipeline may also include other shaders at various stages in the pipeline, such as geometry shaders that use the output of the vertex shaders to generate a new set of primitives, as well as compute shaders (CS) which may implemented by a GPU to perform certain other general computational tasks.

Graphical display devices having a wide field of view (FOV) have been developed. Such devices include head mounted display (HMD) devices. In an HMD device, a small display device is worn on a user's head. The display device has a display optic in front of one eye (monocular HMD) or each eye (binocular HMD). An HMD device typically includes sensors that can sense the orientation of the device and change the scene shown by the display optics as the user's head moves. Conventionally, most stages of rendering scenes for wide FOV displays are performed by planar rendering where all parts of the screen have the same number of pixels per unit area.

However, rendering for virtual reality (VR) programs, which is often performed in conjunction with HMD devices, requires a higher frame rate than conventional flat screen rendering to prevent a user from experiencing motion sickness. HMD for VR has optical systems to show rendered scenes in wide FOV for immersive experiences. While screen area around a primary gaze point requires high resolution, the areas outside the primary gaze point are observed only by the peripheral vision and can therefore maintain a lower resolution, or may contain less detail. Research has been performed that seeks to apply this idea to the pixel level (see co-pending U.S. patent application Ser. No. 14/246,066, to Mark Evan Cerny, incorporated herein by reference). However, by utilizing tessellation and a novel screen space tessellation factor calculation algorithm, it is possible to extend this idea to the geometry level. In computer graphics, tessellation is used to manage datasets of polygons (sometimes called vertex sets) presenting objects in a scene and divide them into suitable structures for rendering. Typically, three dimensional object data is tessellated into triangles, especially for real-time rendering.

A key advantage of tessellation for real-time graphics is that it allows detail to be dynamically added and subtracted from a 3D mesh and its silhouette edges based on control parameters, such as camera distance.

It is within this context that the present disclosure arises.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Figure 1A:
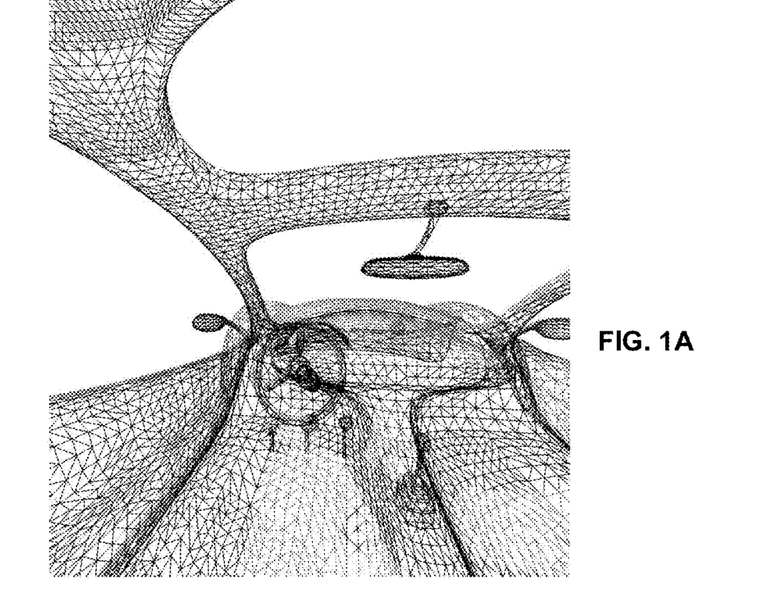
FIG. 1A is a simplified diagram illustrating an example of normal tessellation performed in accordance with the prior art.

FIG. 1A illustrates the current state of rendering of Virtual Reality (VR) environments. In conventional FOV displays, three-dimensional geometry is rendered using a planar projection to the view plane. However, rendering geometry onto displays, especially high FOV view planes, can be very inefficient and result in significant latency and performance issues. These issues can cause the displayed frame rate to drop below desired levels, creating a jarring, non-immersive experience for a user, in addition to potentially inducing motion sickness in a user experience a frame-rate drop while experience a VR environment.

Additionally, regions of the display near the edge of the screen, or regions which the user is not viewing, hold much less meaningful information than regions near the center or to which a user's attention is currently directed. When rendering a scene conventionally, these regions have the same number of vertices and the time spent rendering equal sized regions on the screen is the same.

Figure 1B:
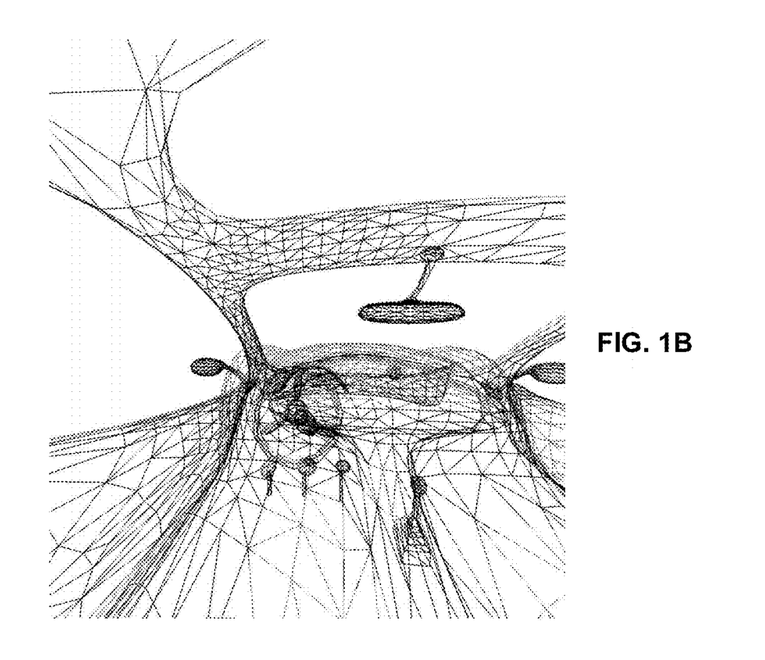
FIG. 1B is a simplified diagram illustrating an example of foveated tessellation in accordance with aspects of the present disclosure.

FIG. 1B illustrates an example of a VR environment in which the scene information is rendered using foveated tessellation in accordance with aspects of the present disclosure. By utilizing foveated tessellation of real-time graphics rendering, detail may be added and subtracted from a 3D mesh and its silhouette edges based on a variety of parameters, e.g., camera distance, user attention, user eye movement, or depth of field. Experiments have shown that by utilizing foveated tessellation, the rendering time of a 3D mesh or wireframe can be reduced by a factor of roughly 4× or more, as fewer vertex computations are required in rendering the image in the tessellation and certain parts of the graphics pipeline subsequent to tessellation.

In some implementations, subsequent graphics processing may utilize a rasterization stage that approximates a projection of the vertices onto a curved viewport. In such implementations, the density of the projected vertices may be determined for selected portions of the screen space referred to as foveal region, such that a higher density of vertices is present in the foveal region, while the density of the projected vertices is lower in remaining regions of the screen space. This can be accomplished by reducing the density of vertices for portions of the screen that are determined to be outside the foveal region. In alternative embodiments, the density of vertices may be increased in selected portions of the screen space such that a higher density of vertices is present in a portion or portions of interest, and the density of vertices in the remaining portion or portions of the screen space is not increased. Accordingly, aspects of the present disclosure utilize a screen space transformation of the type described above to reduce a GPU's computational load by effectively reducing the number of vertex computations for the area of the screen space that is to be rendered.

Figure 2:
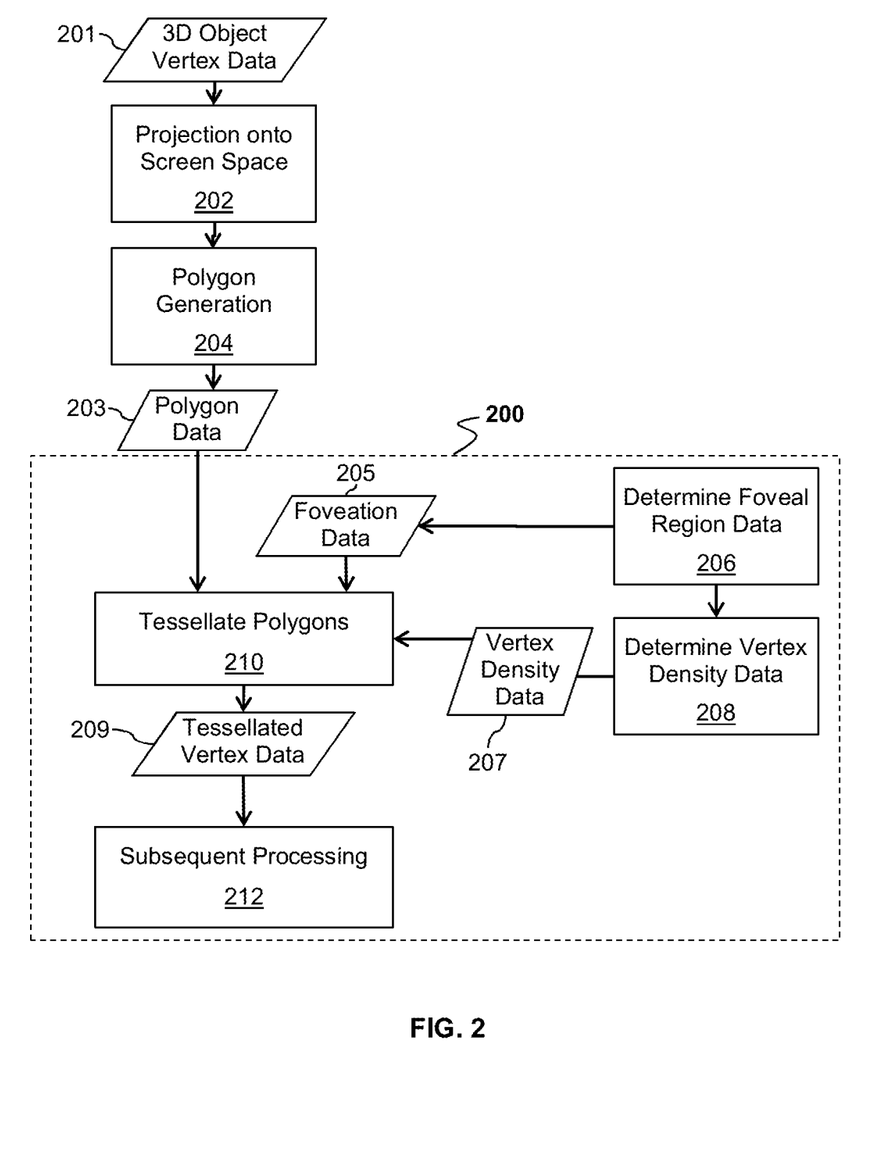
FIG. 2 is a flow diagram depicting a graphics processing method according to an aspect of the present disclosure.

According to aspects of the present disclosure, the reduction in vertex computations may be implemented by a graphics processing method 200 illustrated in FIG. 2A. To understand the context of the graphics processing method, certain conventional elements of computer graphics processing are shown. Specifically, a computer graphics program may generate three-dimensional object vertex data 201 for one or more objects in three-dimensional virtual space. The object vertex data 201 may represent the coordinates of points in the virtual space that correspond to points on the surfaces of geometric shapes that make up one or more objects. An object may be made up of one or more geometric shapes. The object vertex data 201 may define a set of object vertices that correspond to points on the surfaces of one or more shapes that make up an object. By way of example, and not by way of limitation, each geometric shape may be represented by a shape identifier (e.g., cone, sphere, cube, pyramid, etc.), coordinates in virtual space for a relevant location of the object, e.g., coordinates of a centroid of the shape, and relevant geometric parameters for determining coordinates of a point on the surface of the shape. By way of example, for the case of a sphere, the relevant location could be the location of the center of the sphere and the relevant geometric parameter could be the radius of the sphere.

As indicated at 202, the object vertex data 201 may be subject to a process that projects the object vertices onto a screen space in a conventional manner for 3D graphics processing. In some implementations, the projection may approximate a projection of the vertices onto a curved viewport. Polygons may then be generated from the projected vertices, as indicated at 204. The generation of polygons from the projected vertices may be done in a conventional manner. Specifically, edges may be defined between selected pairs of polygons and selected edges may be associated together as polygons. The resulting polygon data 203 includes information identifying the vertices and edges that make up the polygons. The polygon data 203 is used by the method 200, which tessellates the polygons represented by the polygon data in accordance with aspects of the present disclosure.

The method 200 includes determining foveation data 205 for one or more foveal regions of the screen space, as indicated at 206 and determining vertex density information 207, as indicated at 208. The polygon data 203, foveation data 205 and vertex density information 207 are used to tessellate the polygons in accordance with aspects of the present disclosure, as indicated at 210 to produce tessellated vertex data 209. The resulting tessellated vertex data is then used in subsequent graphics processing, as indicated at 212.

By way of example, and not by way of limitation, in tessellating the polygons at 210, the foveation data 205 and vertex density information 207 may define tessellation parameters that vary with respect to location in screen space and are used by a hardware or software tessellator to generate a triangle-based tessellation of the polygons. Examples of such tessellation parameters include the so-called TessFactor, which controls the degree of fineness of the mesh generated by the Direct3D 11 programmable graphics pipeline, which is part of Windows 7 from Microsoft Corporation.

In general terms the foveation data 205 and vertex density information 207 are used to modify a conventional tessellation process to account for the fact that not all regions of the screen space are equally important to the one who views images of the screen space on a display. The foveal regions represent portions of the screen space that are determined by an application to be important to the viewer and are therefore allocated a greater share of available graphics computation resources. The foveal region data 205 may include information identifying a location of a centroid of the foveal region in the screen space, a size of the foveal region relative to the screen space, and shape of the foveal region. A foveal region may be determined at 206 by an application to be of interest to a viewer because (a) it is a region the viewer is likely look at, (b) it is a region the viewer is actually looking at, or (c) it is a region it is desired to attract the user to look at.

With respect to (a), the foveal region may be determined to be likely to be looked at in a context sensitive manner. In some implementations, the application may determine that certain portions of the screen space or certain objects in a corresponding three-dimensional virtual space are "of interest" and such objects may be consistently drawn using a greater number of vertices than other objects in the virtual space. Foveal regions may be contextually defined to be of interest in a static or dynamic fashion. As a non-limiting example of static definition, a foveal region may be a fixed part of the screen space, e.g., a region near the center of the screen, if it is determined that this region is the part of the screen space that a viewer is most likely to look at. For example, if the application is a driving simulator that displays an image of a vehicle dashboard and a windshield, the viewer is likely to be looking at these portions of the image. In this example, the foveal region may be statically defined in the sense that the region of interest is a fixed portion of the screen space. As a non-limiting example of dynamic definition, in a video game a user's avatar, fellow gamer's avatars, enemy artificial intelligence (AI) characters, certain objects of interest (e.g., the ball in a sports game) may be of interest to a the user. Such objects of interest may move relative to the screen space and therefore the foveal region may be defined to move with the object of interest.

With respect to (b) it is possible to track the viewers gaze to determine which portion of a display the viewer is looking at. Tracking the viewer's gaze may be implemented by tracking some combination of the user's head pose and the orientation of the pupils of the user's eyes. Some examples of such gaze tracking are described e.g., in U.S. Patent Application Publications Numbers 2015/0085250, 2015/0085251, and 2015/0085097, the entire contents of all of which are incorporated herein by reference. Further details of estimation of head pose can be found, e.g., in "Head Pose Estimation in Computer Vision: A Survey" by Erik Murphy, in *IEEE TRANSACTIONS ON PATTERN ANALYSIS AND MACHINE INTELLIGENCE*, Vol. 31, No. 4, April 2009, pp 607-626, the contents of which are incorporated herein by reference. Other examples of head pose estimation that can be used in conjunction with embodiments of the present invention are described in "Facial feature extraction and pose determination", by Athanasios Nikolaidis *Pattern Recognition*, Vol. 33 (Jul. 7, 2000) pp. 1783-1791, the entire contents of which are incorporated herein by reference. Additional examples of head pose estimation that can be used in conjunction with embodiments of the present invention are described in "An Algorithm for Real-time Stereo Vision Implementation of Head Pose and Gaze Direction Measurement", by Yoshio Matsumoto and Alexander Zelinsky in *FG '00 Proceedings of the Fourth IEEE International Conference on Automatic Face and Gesture Recognition*, 2000, pp 499-505, the entire contents of which are incorporated herein by reference. Further examples of head pose estimation that can be used in conjunction with embodiments of the present invention are described in "3D Face Pose Estimation from a Monocular Camera" by Qiang Ji and Ruong Hu in *Image and Vision Computing*, Vol. 20, Issue 7, 20 February, 2002, pp 499-511, the entire contents of which are incorporated herein by reference.

With respect to (c), it is a common cinematic device to change the depth of focus of a scene to focus on a portion of interest, e.g., a particular actor who is speaking. This is done to draw the viewer's attention to the portion of the image that is in focus. According to aspects of the present disclosure, a similar effect may be implemented with computer graphics by moving the foveal region to a desired portion of the screen so that that portion has a greater density of vertices and is rendered in greater detail as a result.

In addition to locating a centroid, determining the foveal region data at 206 may also involve determining the size and shape of the foveal region relative to the screen space. The shape of the foveal region, e.g., circular, elliptical, arbitrary may be determined in advance. The size of the foveal region may depend on a distance of the viewer from the screen and the size of the screen. Generally, the larger the screen and the closer the viewer is to the screen the smaller the foveal region relative to the screen size. Conversely, the smaller the screen and the further the viewer is from the screen the larger the foveal region relative to the screen size.

For fixed displays, such as television sets, tablet computer displays, smart phone displays, and computer monitors, screen size is fixed and may be determined from metadata about the display. Such metadata may be exchanged when the display is connected to a processing system, such as a computer or gaming console. For projection type displays the size of the screen may be determined from additional information regarding the distance from the projector to the wall or other surface on which images are projected.

Figure 3A:
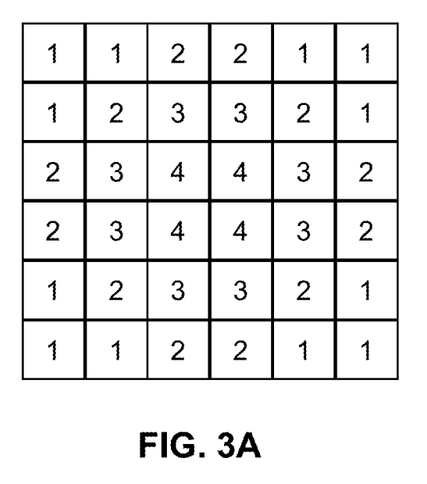
FIG. 3A is a schematic diagram of a screen space illustrating an example of determining a foveation region of a screen space in accordance with aspects of the present disclosure.
Figure 3B:
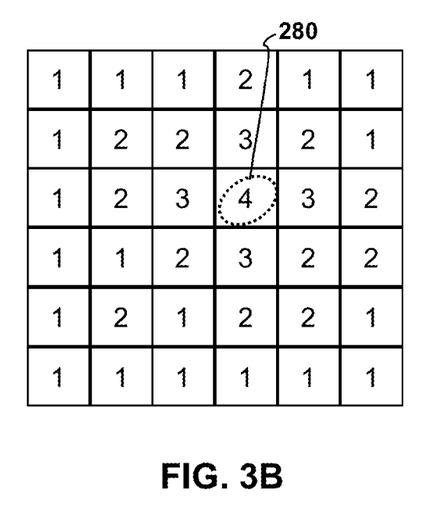
FIG. 3B is a schematic diagram of a screen space illustrating an alternative example of determining a foveation region of a screen space in accordance with aspects of the present disclosure.

FIG. 3A illustrates an example of determining a foveal region by screen location in accordance with the above described aspects. In the example shown in FIG. 3A, the screen space is divided into subsections of equal size in pixels. One or more central subsections of an example screen space are desired to maintain or increase the density of tessellated vertices, whereas subsections further from the center have progressively lower densities of tessellated vertices. The foveation data 205 may specify which screen space subsections are part of the foveal region of interest 280 and which are not. In some implementations there may be two or more foveal regions of interest specified by the foveation data 205. The vertex density information 207 may be adjusted in accordance with the foveation data so that the density of vertices is highest in the subsection or subsections of the screen containing a portion of interest 280 and progressively lower in subsections further away from the foveal portion, as shown in FIG. 3B. By way of example, and not by way of limitation, a tessellation factor for a given input polygon (e.g., patch) may be adjusted based on its importance (e.g., as determined from the location of the input polygon in the screen space and the foveation data 205). A tessellation unit, which may be implemented in hardware or software then generates output polygons (e.g., triangles) at 210 with a desired vertex density as determined by the tessellation factor.

In conjunction with determining the foveal region, the density of vertices in the foveal region and outside the foveal region may be determined, as indicated at 208. By way of example, and not by way of limitation, the vertex density information 207 may include a maximum density for the foveal region and a minimum density for regions outside the foveal region may be determined. The terms "maximum density" and "minimum density" are used herein as terms of convenience. The maximum generally refers to a density distribution for the foveal region(s) having a higher average vertex density than a corresponding density distribution for the remaining screen space regions. Likewise, the minimum density generally refers to a density distribution for the remaining region(s) that have a lower average vertex density than a corresponding density distribution for the foveal screen space region(s).

Vertex density values as functions of location in screen space (e.g., maximum and minimum density values) may be fixed in advance and stored in memory, in which case determining the values during graphics processing is a trivial matter of retrieving the values from memory. The vertex density values may depend on a number of factors including (a) the pixel density screen space, (b) the maximum available graphics processing load capability, (c) the proximity of the viewer to the screen, (d) the size of the screen in pixels, and (e) the nature of the graphics being presented.

With regard to (a), the higher the pixel density in screen space, the higher maximum and minimum density values may be. With regard to (b), greater available graphics processing load capability means that computational savings from adjustment of the vertex density may be less critical, leading to a higher maximum and minimum density values. Reduced available graphics processing load capability means that computational savings from adjustment of the vertex density are more critical, leading to a lower value for the minimum density and possibly for the maximum density as well.

With regard to (c), as the viewer moves closer to the screen the need for detail in the foveal region increases (leading to a greater value for the maximum density) and the need for detail outside the foveal region decreases (allowing for a smaller value for the minimum density). With regard to (d), as the screen size decreases the foveal region becomes larger relative to the screen. Fewer pixels available on the screen generally means that the minimum value cannot be made too small.

In certain implementations, the transition of densities (or "falloff") between the foveal portion or portions of interest 280 and the remaining portions may be defined with a closed loop, based on the available computational resources and the complexity of the scene. In certain implementations, a foveation steering element (determining which portion or portions of the screen are the portions of interest), starting and ending mesh density of a rendered scene, and falloff function may be defined statically in advance. In alternative embodiments, these elements may be defined dynamically based on a software agent in the program region that analyzes frame data to determine points or regions of interest. In alternative embodiments, these elements may be predefined by the game developer.

Figure 3C:
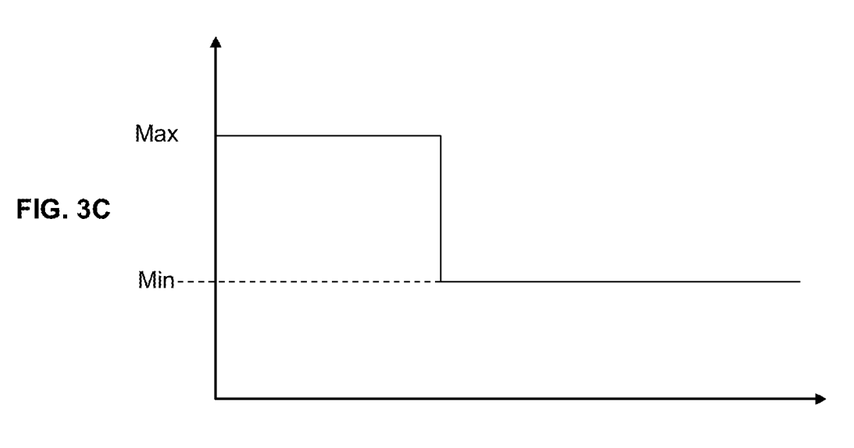
FIGS. 3C-3E are graphs depicting examples of transitions in vertex density over a screen space in accordance with aspects of the present disclosure.
Figure 3D:
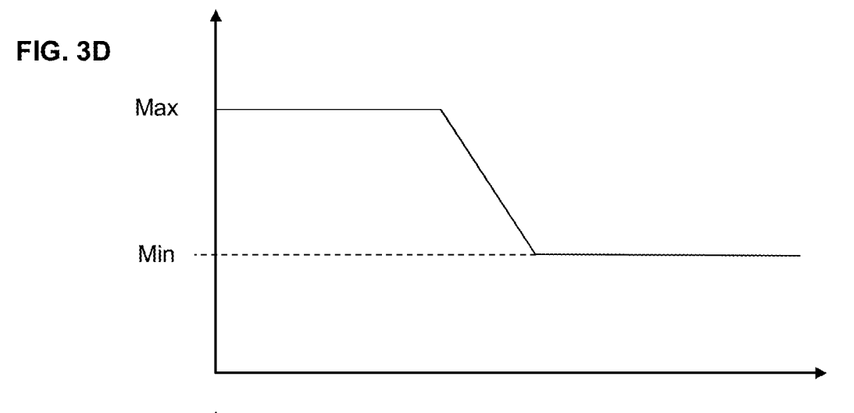
Figure 3E:
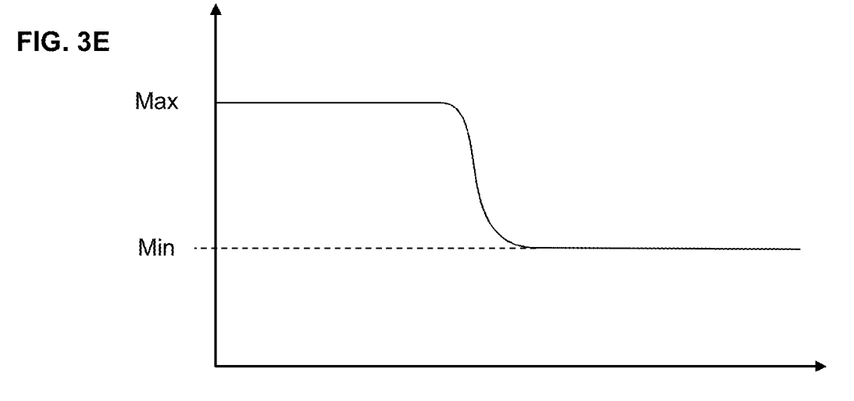

FIGS. 3C, 3D, and 3E illustrate examples of "falloff" in vertex density between the foveal portions and remaining portions of the screen space. FIG. 3C illustrates an example of a step function transition between Max and Min density with respect to distance from a foveal screen space region. In this case, the vertex density has the maximum value within the foveal region and the minimum value elsewhere.

FIG. 3D illustrates an example of a linear function transition between Max and Min density with respect to distance from foveal screen space region. In a transition region the density depends linearly on distance from the region of maximum or minimum density, depending on how the coordinate system is defined.

FIG. 3E illustrates an example of a sigmoidal ("S"-shaped) function transition between Max and Min density with respect to distance from foveal screen space region. In general, the integral of any smooth, positive, "bump-shaped" function will be sigmoidal. Examples of sigmoid functions include, but are not limited to, the logistic function, the generalized logistic function, sigmoid functions include the ordinary arctangent, the hyperbolic tangent, the Gudermannian function, and the error function $$\mathrm{erf}(x) = \frac{2}{\sqrt{\pi}} \int_0^x e^{t^2} dt\bigg),$$

the complementary error function (1−erf(x)), and algebraic functions like $$f(x) = \frac{x}{\sqrt{1+x^2}}.$$

The logistic function has the form $$f(x) = \frac{L}{1 + e^{-k(x-x_0)}},$$

where:
 $x_0$=the x-value of the sigmoid's midpoint,
 L=the curve's maximum value, and
 k=the steepness of the curve.

In additional alternative embodiments, these elements may be dynamically defined by an external signal. Examples of the external signal include, but are not limited to, gaze tracking, laser pointer tracking, finger tracking, head tracking, tracking with a controller or peripheral device, tracking another player character in a VR environment, or detecting and interpreting conversation between characters. In embodiments wherein the external signal includes gaze tracking, the external signal may include, but is not limited to, a combination of head and pupil tracking. In such embodiments, a user's pupils may be tracked with a camera. In embodiments wherein the external signal includes head tracking, the tracking of the user's head may include, but is not limited to tracking the user's head with an inertial sensor and/or tracking of light sources on a HMD device.

According to aspects of the present disclosure, certain implementations may utilize existing surface subdivision software, e.g., open source software such as Open Subdiv, to compute a smooth limit surface from a small number of vertices. In such embodiments, polygon tessellation at 210 may tessellate the foveal portion or portions of interest 280 to follow the smooth surface limit. The remaining portions may be tessellated using a larger error tolerance.

Performing subsequent graphics operations at 212 may include something as simple as storing the tessellated vertex data in a memory or transmitting the tessellated vertex data to another processing system. In addition, such subsequent processing may include well-known stages of the graphics processing pipeline. By way of example, and not by way of limitation, primitive assembly is performed on the tessellated vertices to generate a one or more primitives in screen space. Scan conversion may be performed on the one or more primitives to determine which pixel or pixels are part of corresponding primitives. A finished frame may then be generated by performing pixel processing to assign pixel values to the pixel or pixels. In some implementations, the finished frame can be stored in the memory or displayed on the display device. Additional details of a graphics pipeline are discussed below with respect to FIG. 4 and FIG. 5.

System and Apparatus

Figure 4:
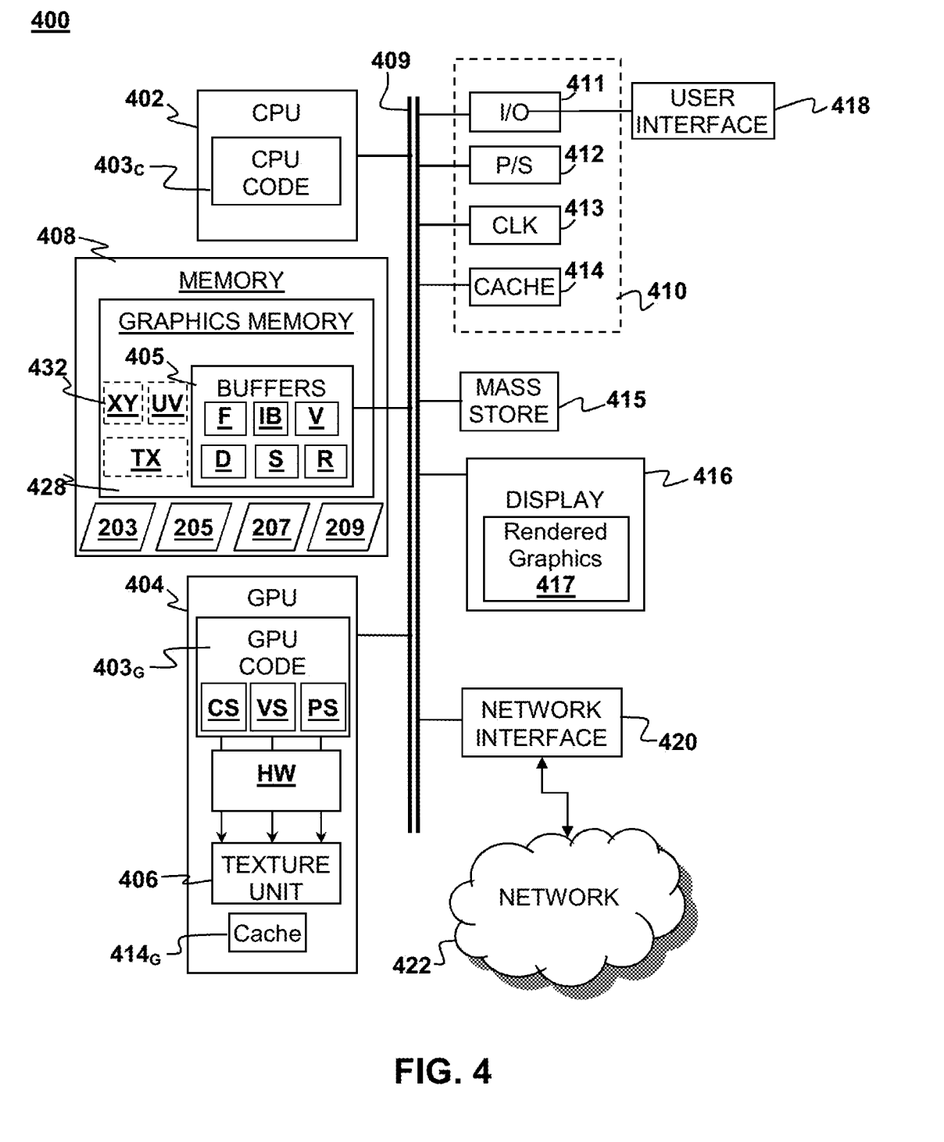
FIG. 4 is a block diagram of a graphics processing system in accordance with aspects of the present disclosure.

Aspects of the present disclosure include graphics processing systems that are configured to implement graphics processing in which effective resolution varies by screen location by adjusting a density of vertices for selected portions of the screen-space with respect to portions of the screen space determined to be portions of interest. By way of example, and not by way of limitation, FIG. 4 illustrates a block diagram of a computer system 400 that may be used to implement graphics processing according to aspects of the present disclosure. According to aspects of the present disclosure, the system 400 may be an embedded system, mobile phone, personal computer, tablet computer, portable game device, workstation, game console, and the like.

The system 400 generally includes a central processor unit (CPU) 402, a graphics processor unit (GPU) 404, and a memory 408 that is accessible to both the CPU and GPU. The system 400 may also include well-known support functions 410, which may communicate with other components of the system, e.g., via a data bus 409. Such support functions may include, but are not limited to, input/output (I/O) elements 411, power supplies (P/S) 412, a clock (CLK) 413 and cache 414. In addition to the cache 414, the GPU 404 may include its own GPU cache $414_G$, and the GPU may be configured so that programs running on the GPU 404 can read-through or write-though the GPU cache $414_G$.

The system 400 may include the display device 416 to present rendered graphics 417 to a user. In alternative implementations, the display device 416 is a separate component that works in conjunction with the system, 400. The display device 416 may be in the form of a flat panel display, head mounted display (HMD), cathode ray tube (CRT) screen, projector, or other device that can display visible text, numerals, graphical symbols or images. In particularly useful implementations, the display 416 is a large field of view (FOV) device having a screen with a field of view of 90 degrees or more (e.g., 114 degrees or more). The display device 416 displays rendered graphic images 417 (e.g., finished frames 460) processed in accordance with various techniques described herein.

The system 400 may optionally include a mass storage device 415 such as a disk drive, CD-ROM drive, flash memory, tape drive, or the like to store programs and/or data. The system 400 may also optionally include a user interface unit 418 to facilitate interaction between the system 400 and a user. The user interface 418 may include a keyboard, mouse, joystick, light pen, game controller, or other device that may be used in conjunction with a graphical user interface (GUI). The system 400 may also include a network interface 420 to enable the device to communicate with other devices over a network 422. The network 422 may be, e.g., a local area network (LAN), a wide area network such as the internet, a personal area network, such as a Bluetooth network or other type of network. These components may be implemented in hardware, software, or firmware, or some combination of two or more of these.

The CPU 402 and GPU 404 may each include one or more processor cores, e.g., a single core, two cores, four cores, eight cores, or more. The memory 408 may be in the form of an integrated circuit that provides addressable memory, e.g., RAM, DRAM, and the like. The memory 408 may include a dedicated graphics memory 428 that may store graphics resources and temporarily store graphics buffers 405 of data for a graphics rendering pipeline. The graphics buffers 405 may include, e.g., vertex buffers VB for storing vertex parameter values, index buffers IB for holding vertex indices, depth buffers (e.g., Z-buffers) DB for storing depth values of graphics content, stencil buffers SB, frame buffers FB for storing completed frames to be sent to a display, and other buffers. In the example shown in FIG. 4, the graphics memory 428 is shown as part of the main memory. In alternative implementations, the graphics memory 428 could be a separate hardware component, possibly integrated into the GPU 404. The memory 408 (possibly the graphics memory 428) may also temporarily store the polygon data 203, foveation data 205, vertex density data 207 and tessellated vertex data 209.

By way of example, and not by way of limitation, the CPU 402 and GPU 404 may access the memory 408 via the bus or busses 409. In some cases, it may be useful for the system 400 to include two or more different buses. The memory 408 may contain data that can be accessed by the CPU 402 and GPU 404. The GPU 404 may include a plurality of compute units configured to perform graphics processing tasks in parallel. Each compute unit may include its own dedicated local memory store, such as a local data share. Alternatively, the compute units may each access the memory 408 or a dedicated graphics memory 428.

The CPU may be configured to execute CPU code $403_C$, which may include an application that utilizes graphics, a compiler and a graphics API. The graphics API can be configured to issue draw commands to programs implemented by the GPU. The CPU code $403_C$ may also implement physics simulations and other functions. The GPU 404 may be configured to operate as discussed above. In particular, the GPU may execute GPU code $403_G$, may include instructions configured to implement the method 200 of FIG. 2, described above. In addition, the GPU code $403_G$ may also implement well-known shaders, such as compute shaders CS, vertex shaders VS, and pixel shaders PS. To facilitate passing of data between the compute shaders CS and the vertex shaders VS the system may include one or more buffers 405, which may include a frame buffer FB. The GPU code $403_G$ may also optionally implement other types of shaders (not shown), such as pixel shaders or geometry shaders. Each compute unit may include its own dedicated local memory store, such as a local data share. The GPU 404 may include one or more texture units 406 configured to perform certain operations for applying textures to primitives as part of a graphics pipeline.

According to certain aspects of the present disclosure, the CPU code $403_c$ and GPU code $403_g$ and other elements of the system 400 are configured to implement a graphics pipeline in which the GPU 404 may receive the polygon data 203. The polygon data 203 can be generated from calculations, e.g., physics simulations of objects in a three-dimensional virtual space, implemented by execution of the CPU code $403_C$ by the CPU 402. The GPU 404 performs a projection of the polygon vertices onto a screen space of the display device 416 and tessellation of the resulting projected polygons. The GPU 404 adjusts the density of the vertices for the tessellation of the polygons in accordance with the foveation data 205 and vertex density data 207 such that the density of vertices is higher in selected foveal portions of the screen space and lower in remaining portions.

The GPU 404 may then perform primitive assembly on the vertices to generate a one or more primitives in screen space from the projection of the vertices onto the screen space. Scan conversion may then be performed on the one or more primitives to determine which pixel of screen space are part of corresponding primitives. The GPU 404 may then generate a finished frame 460 by performing pixel processing to assign pixel values to the pixel or pixels that are part of the corresponding primitives. The finished frame can be stored in the memory 408 or graphics memory 428 (e.g., in the frame buffer FB) or displayed on the display device 416.

The projection of the polygon vertices onto the screen space and other related portions of the graphics pipeline can be performed in software, e.g., by a front end implemented as a compute shader CS. Alternatively, the projection of the vertices onto the screen space and other related portions of the graphics pipeline can be implemented by specially designed hardware components HW that are configured to implement these functions.

Aspects of the present disclosure also include implementations in which the foveation data 205 and/or vertex density data 207 are adjusted dynamically. For example, the foveal region may be defined in conjunction with gaze tracking. In such implementations, the system 400 includes hardware for tracking a user's gaze, i.e., where a user's eye is pointing, and relating this information to a corresponding screen location that the user is looking at. One example of such hardware could include a digital camera in a known location with respect to the screen of the display device 416 and pointed in the general direction of a user. The digital camera could be part of the user interface 418 or a separate component. The CPU code $403_C$ could include image analysis software that analyzes images from the camera to determine (a) if the user is in the image; (b) if the user is facing the camera; (c) if the user is facing the screen; (d) if the user's eyes are visible; (e) the orientation of the pupils of the user's eyes relative to the user's head; and (0 the orientation of the user's head relative to the camera. From the known position and orientation of the camera with respect to the screen, the orientation of the pupils of the user's eyes relative to the user's head and the orientation of the user's head relative to the camera the image analysis software could determine whether the user is looking at the screen and, if so, screen space coordinates for the portion of the screen the user is looking at. The CPU code $403_c$ could then pass these screen coordinates to the GPU code $403_G$, which could determine the subsection or subsections containing the foveal portion (i.e., the portion of interest). The GPU code $403_G$ could then modify the adjustment of vertices accordingly so that the resolution is highest in the subsection or subsections containing the foveal portion and progressively lower in subsections further away from the foveal portion, as shown in FIG. 3B.

By way of example, and not by way of limitation, specially designed hardware HW, the texture unit(s) 406, certain types of shaders, and other parts of the graphics pipeline described below may be implemented by special purpose hardware, such as an application-specific integrated circuit (ASIC), Field Programmable Gate Array (FPGA), or a system on chip (SoC or SOC).

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:
One or more processor cores (e.g., microcontroller, microprocessor or digital signal processor (DSP) cores.
Memory blocks, e.g., read only memory (ROM), random access memory (RAM), electrically erasable programmable read-only memory (EEPROM) and flash memory.
Timing sources, such as oscillators or phase-locked loops.
Peripherals, such as counter-timers, real-time timers, or power-on reset generators.
External interfaces, e.g., industry standards such as universal serial bus (USB), FireWire, Ethernet, universal asynchronous receiver/transmitter (USART), serial peripheral interface (SPI) bus.
Analog interfaces including analog to digital converters (ADCs) and digital to analog converters (DACs).
Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals and interfaces.

In some implementations, some or all of the functions of parts of the graphics pipeline may alternatively be implemented by appropriately configured software instructions executed by a software programmable general purpose computer processor, e.g., as compute shaders CS executed by the GPU 404. Such instructions may be embodied in a computer-readable medium, e.g., memory 408, graphics memory 428, or storage device 415.

Graphics Pipeline

Figure 5:
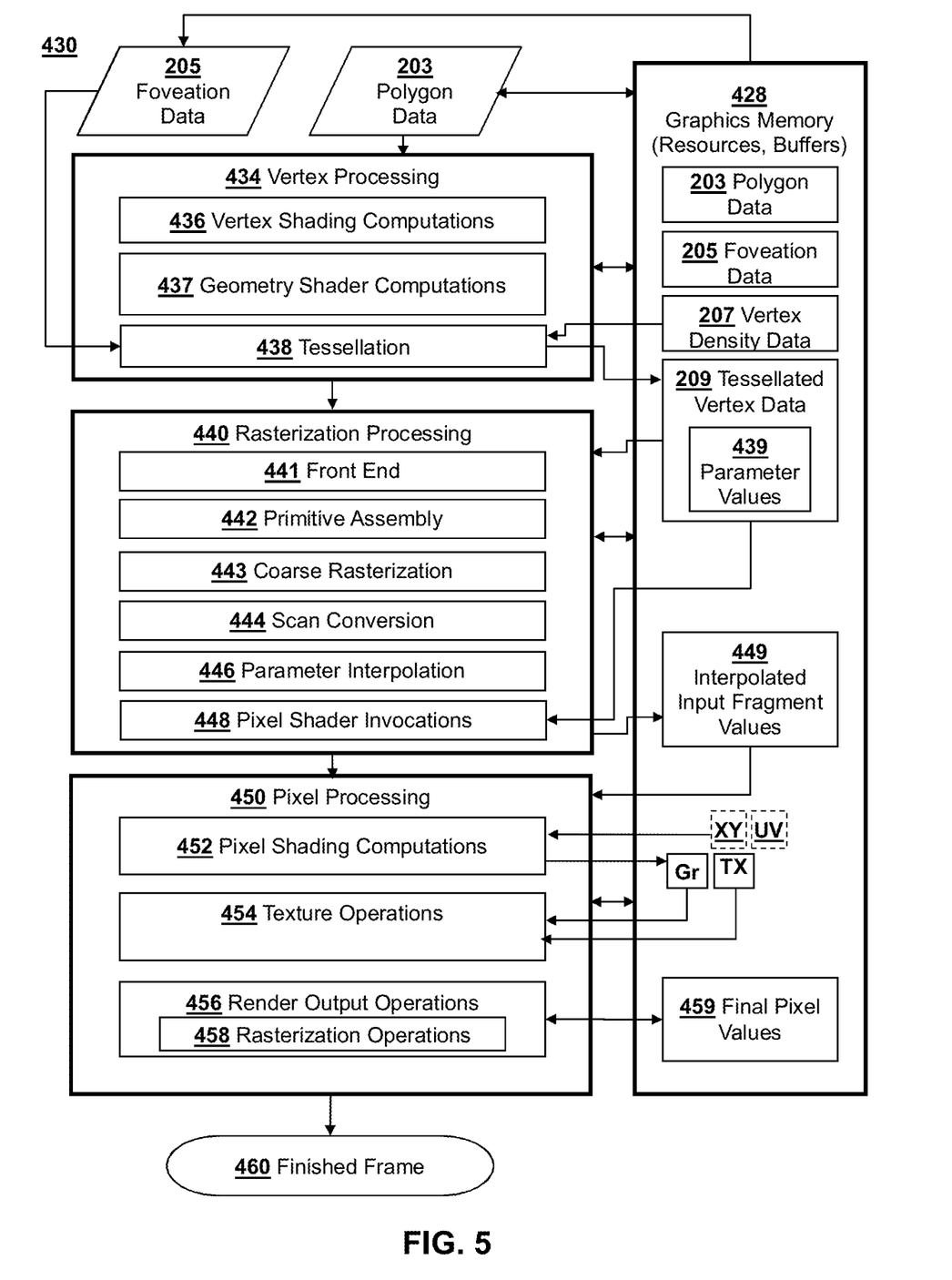
FIG. 5 is a block diagram of a graphics processing pipeline in accordance with aspects of the present disclosure.

According to aspects of the present disclosure, the system 400 may be configured to implement the method 200 of FIG. 2 in conjunction with portions of a graphics rendering pipeline. FIG. 5 illustrates an example of a graphics rendering pipeline 430 in accordance with aspects of the present disclosure.

The rendering pipeline 430 may be configured to render graphics as images that depict a scene having a two-dimensional or preferably three-dimensional geometry in virtual space (sometime referred to herein as "world space"). The early stages of the pipeline may include operations performed in virtual space before the scene is rasterized and converted to screen space as a set of discrete picture elements suitable for output on the display device 416. Throughout the pipeline, various resources contained in the graphics memory 428 may be utilized at the pipeline stages and inputs and outputs to the stages may be temporarily stored in buffers contained in the graphics memory before the final values of the images are determined.

The rendering pipeline may operate on input data, such as the polygon data 203 that represents one or more virtual objects defined by a set of vertices that are set up in virtual space and have geometry that is defined with respect to coordinates in the scene. The early stages of the pipeline may include what is broadly categorized as a vertex processing stage 434 in FIG. 5, and this may include various computations to process the vertices of the objects in virtual space. The vertex processing stage may include vertex shading computations 436, which may manipulate various parameter values of the vertices in the scene, such as position values (e.g., X-Y coordinate and Z-depth values), color values, lighting values, texture coordinates, and the like. Preferably, the vertex shading computations 436 are performed by one or more programmable vertex shaders VS of the GPU 404. The vertex processing stage includes additional vertex processing computations, such as geometry shader computations 437 which project the polygon vertices onto the screen space and tessellation shader computations 438, which generate new vertices and new geometries from the projected polygon vertices. Tessellation computations subdivide scene geometries and geometry shading computations to generate new scene geometries beyond those initially set up in the application implemented by the CPU code 403c. It is at this stage that foveated tessellation may occur, and the density of vertices in the 3D mesh or wireframe may be adjusted by tessellation shader computations 438 as defined in accordance with the foveation data 205 and vertex density data 207. Once the vertex processing stage 434 is complete, the scene is defined by a set of tessellated vertices represented by the tessellated vertex data 209. In addition each tessellated vertex has a set of vertex parameter values 439. The vertex parameter values 439 may include texture coordinates, tangents, lighting values, colors, positions, and the like.

The pipeline 430 may then proceed to rasterization processing stages 440 associated with converting the scene geometry into screen space and a set of discrete picture elements, i.e., pixels. The virtual space geometry (which can be three-dimensional) is transformed to screen space geometry (which is typically two-dimensional) through operations that may essentially compute the projection of the objects and vertices from virtual space to the viewing window (or "viewport") of the scene. Subsets of the vertices are grouped to define sets of primitives in screen space. According to aspects of the present disclosure, the rasterization stage 440 approximates a projection of the vertices onto a curved viewport.

In accordance the aspects of the present disclosure, the graphics pipeline 430 includes a front end 441 to the rasterization stage. The front end can be implemented as part of the rasterization stage or as an intermediate stage between vertex processing 434 and the rasterization stage 440. In the example depicted in FIG. 5, the front end 441 is shown as part of the rasterization stage 440. However, aspects of the present disclosure are not limited to such implementations. In certain implementations, the front end 441 is implemented wholly or partially as a compute shader CS running on the GPU 404. However, aspects of the present disclosure are not limited to such implementations.

Operation of the front end 441 and related aspects of the present disclosure can be understood by referring simultaneously to FIG. 4 and FIG. 5.

The rasterization processing stage 440 depicted in FIG. 5 includes primitive assembly operations 442, which may set up the primitives defined by each set of vertices in the scene. Each vertex may be defined by an index, and each primitive may be defined with respect to these vertex indices, which may be stored in index buffers IB in the graphics memory 428. The primitives preferably include triangles defined by three vertices each, but may also include point primitives line primitives, and other polygonal shapes. During the primitive assembly stage 442, certain primitives may optionally be culled. For example, those primitives whose indices indicate a certain winding order may be considered to be back-facing and may be culled from the scene.

By way of example, and not by way of limitation, where the primitives are in the form of triangles defined by vertices in three dimensional virtual space, the primitive assembly determines where on the screen of the display 416 each triangle is located. Clipping and screen space transformation operations are typically performed by the primitive assembly unit 442. The optional scan conversion operations 444 sample the primitives at each pixel and generate fragments (sometimes referred to as pixels) from the primitives for further processing when the samples are covered by the primitive. The scan conversion operations include operations that take a primitive that has been converted to screen space coordinates and determines which pixels are part of that primitive. In some implementations, multiple samples are taken within the primitives during the scan conversion operations 444, which may be used for anti-aliasing purposes. In certain implementations, different pixels may be sampled differently. For example, some edge pixels may contain a lower sampling density than center pixels to optimize certain aspects of the rendering for certain types of display device 416, such as head mounted displays (HMDs). The fragments (or "pixels") generated from the primitives during scan conversion 444 may have parameter values that may be interpolated to the locations of the pixels from the vertex parameter values 439 of the vertices of the primitive that created them. The rasterization stage 440 may include parameter interpolation operations 446 stage to compute these interpolated fragment parameter values 449, which may be used as inputs for further processing at the later stages of the pipeline.

According to aspects of the present disclosure, between primitive assembly 442 and scan conversion 444 certain operations may take place that account for the fact that different subsections of the screen have different pixel resolutions. In particular implementations, once the screen location for the vertices of a primitive are known, a coarse rasterization 443 can be done to find all the predefined screen subsections (sometimes referred to herein as coarse rasterization tiles or supertiles) that the primitive overlaps. For each subsection that the primitive overlaps, the vertex locations for the primitive are adjusted to account for the pixel resolutions of the subsection. Scan conversion 444 and subsequent processing stages generate the final pixel values by performing pixel processing only on the specified number of active pixels for the relevant subsection or subsections.

In certain implementations, the GPU 404 may be configured to implement coarse division of primitives between subsections in software, and the projection of the vertices, primitive assembly, and scan conversion in hardware. In some such implementations, the GPU 404 is configured to associate subsection indices to primitive vertices in software, with each subsection index selecting a screen space projection and viewport from a palette implemented in hardware. In other such implementations, the GPU 404 is configured to associate subsection indices to primitive vertex indices in software, with each subsection index selecting a screen space projection and viewport from a palette implemented in hardware.

The graphics pipeline 430 further includes pixel processing operations, indicated generally at 450 in FIG. 5, to further manipulate the interpolated parameter values 449 and perform further operations determining how the fragments contribute to the final pixel values for display 416. According to aspects of the present disclosure, these tasks can be performed in a conventional fashion. The pixel processing tasks include pixel shading computations 452 that further manipulate the interpolated parameter values 449 of the fragments. The pixel shading computations 452 may be performed by a programmable pixel shader or purpose built hardware in the GPU 404. Pixel shader invocations 448 may be initiated based on the sampling of the primitives during the rasterization processing stages 440. The pixel shading computations 452 may output values to one or more buffers 405 in graphics memory 428, sometimes referred to as render targets RT, or if multiple, as multiple render targets (MRTs). MRTs allow pixel shaders to optionally output to more than one render target, each with the same screen dimensions but potentially with a different pixel format.

The pixel processing operations 450 typically include texture mapping operations 454, which may be performed to some extent by one or more shaders (e.g., pixel shaders PS compute shaders CS, vertex shaders VS or other types of shaders) and to some extent by the texture units 406. The pixel shader computations 452 include calculating texture coordinates UV from screen space coordinates XY, and sending the texture coordinates to the Texture Operations 454, and receiving texture data TX. The texture coordinates UV could be calculated from the screen space coordinates XY in an arbitrary fashion, but typically are calculated from interpolated input values or sometimes from the results of previous texture operations. Gradients Gr are often directly calculated from quads of texture coordinates by the texture units 406 (Texture Operations hardware units), but can optionally be calculated explicitly by the pixel shader computations 452 and passed to the texture operations 454 rather than relying on the texture units 406 to perform the default calculation.

The texture operations 456 generally include the following stages, which can be performed by some combination of a pixel shader PS and a texture unit 406. First, one or more texture coordinates UV per pixel location XY are generated and used to provide a coordinate set for each texture mapping operation. Gradient values Gr are calculated from the texture coordinates UV and used to determine a level of detail (LOD) for a texture to apply to the primitive.

The pixel processing 450 generally culminates in render output operations 456, which may include what are commonly known as raster operations (ROP). Rasterization Operations (ROP) is simply run multiple times per pixel, once for each render target among the multiple render targets (MRTs). During the output operations 456, the final pixel values 459 may be determined in a frame buffer, which may optionally include merging fragments, applying stencils, depth tests, and certain per sample processing tasks. The final pixel values 459 include the collected output to all active render targets (MRTs). The GPU 404 uses the final pixel values 459 to make up a finished frame 460, which may optionally be displayed on the pixels of the display device 416 in real-time.

In some implementations, the graphics pipeline may implement modified rasterization processing 440 and/or modified pixel processing 450 in which the screen resolution and computational load for processing of pixels varies according to screen space location. Examples of such modified graphics processing are described e.g., in co-pending U.S. patent application Ser. Nos. 14/246,066 and 14/246,062, both of which were filed Apr. 5, 2014, the entire contents of both of which are herein incorporated by reference. By modifying the graphics pipeline to concentrate computational resources on foveal regions of the screen space the overall computational load throughout the graphics pipeline may be reduced. By way of example, in some implementations, the CPU code $403_C$, GPU code $403_G$, and texture unit 406 may be further configured to implement modifications to texture mapping operations in conjunction with screen location dependent variable resolution. In particular, a pixel shader PS and texture unit 406 can be configured to generate one or more texture coordinates UV per pixel location XY to provide a coordinate set for one or more texture mapping operations, calculate gradient values Gr from the texture coordinates UV and use the gradient values to determine a level of detail (LOD) for a texture to apply to the primitive. These gradient values can be adjusted to account for the variable resolution as well as deviance from orthonormality in the sample locations.

Additional Aspects

Aspects of the present disclosure also include a non-transitory computer-readable medium having computer executable instructions embodied therein that, when executed, implement graphics processing in accordance with the above-mentioned aspects, e.g., as described above with respect to FIG. 2, FIG. 4, and FIG. 5.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for graphics processing with a graphics processing system having a processing unit, comprising:
with the processing unit, performing a tessellation of a first set of polygons projected onto a screen space of a display device to divide the first set of polygons to produce a second set of polygons represented by tessellated vertex data, wherein the tessellated vertex data is characterized by a first density distribution of vertices in one or more regions of the screen space and by a second density distribution of vertices in one or more remaining regions of the screen space, wherein the first and second density distribution at least depend upon a user proximity to the display device, wherein a minimum density for the second density distribution decreases when the user moves closer to the screen, wherein a maximum density for the first density distribution increases when the user moves closer to the screen, wherein the first density is higher than the second density, wherein the first density distribution of vertices follows a smooth limit surface and the second density distribution of vertices has a larger error tolerance than the first density distribution of vertices; and
with the processing unit, performing subsequent graphics operations on the second set of polygons.

2. The method of claim 1, wherein said performing subsequent graphics operations on the second set of polygons includes storing the tessellated vertex data in a memory.

3. The method of claim 1, wherein said performing subsequent graphics operations on the second set of polygons includes transmitting the tessellated vertex data to another processing system.

4. The method of claim 1, wherein said performing subsequent graphics operations on the second set of polygons includes performing primitive assembly on the set of tessellated vertices to generate a one or more primitives in screen space.

5. The method of claim 1, wherein said performing subsequent graphics operations on the second set of polygons includes:
performing primitive assembly on the tessellated vertex data to generate one or more primitives in screen space; and
performing scan conversion on the one or more primitives to determine which pixel or pixels of the plurality of pixels are part of corresponding primitives of the one or more primitives.

6. The method of claim 1, wherein said performing subsequent graphics operations on the second set of polygons includes:
performing primitive assembly on the tessellated vertex data to generate one or more primitives in screen space; and
performing scan conversion on the one or more primitives to determine which pixel or pixels of the plurality of pixels are part of corresponding primitives of the one or more primitives; and
generating a finished frame by performing pixel processing to assign pixel values to the pixel or pixels that are part of the corresponding primitives.

7. The method of claim 1, wherein said performing subsequent graphics operations on the second set of polygons includes:
performing primitive assembly on the tessellated vertex data to generate one or more primitives in screen space; and
performing scan conversion on the one or more primitives to determine which pixel or pixels of the plurality of pixels are part of corresponding primitives of the one or more primitives; and
generating a finished frame by performing pixel processing to assign pixel values to the pixel or pixels that are part of the corresponding primitives.

8. The method of claim 1, wherein the one or more regions are defined by an external signal.

9. The method of claim 8, wherein the external signal represents a location on the display device toward which a user's gaze is directed.

10. The method of claim 1, wherein the one or more regions include one or more portions of the screen space proximate a center of the screen space.

11. The method of claim 1, wherein performing subsequent graphics operations on the second set of polygons includes generating data corresponding a finished frame configured for presentation on the display device.

12. A system for graphics processing, comprising:
a processing unit;
a memory;
instructions stored in the memory and executable by the processing unit, wherein the instructions are configured to cause the system to implement a method for graphics processing when executed by the processing unit, the method comprising:
with the processing unit, performing a tessellation of a first set of polygons projected onto a screen space of a display device to divide the first set of polygons to produce a second set of polygons represented by tessellated vertex data, wherein the tessellated vertex data is characterized by a first density distribution of vertices in the one or more regions of the screen space and by a second density distribution of vertices in one or more remaining regions of the screen space, wherein the first and second density distribution at least depend upon a user proximity to the display device, wherein a minimum density for the second density distribution decreases when the user moves closer to the screen, wherein a maximum density for the first density distribution increases when the user moves closer to the screen, wherein the first density is higher than the second density, wherein the first density distribution of vertices follows a smooth limit surface and the second density distribution of vertices has a larger error tolerance than the first density distribution of vertices; and
with the processing unit, performing subsequent graphics operations on the second set of polygons.

13. The system of claim 12, wherein said performing subsequent graphics operations on the second set of polygons includes storing the tessellated vertex data in a memory.

14. The system of claim 12, wherein said performing subsequent graphics operations on the second set of polygons includes transmitting the tessellated vertex data to another processing system.

15. The system of claim 12, wherein said performing subsequent graphics operations on the second set of polygons includes performing primitive assembly on the tessellated vertex data to generate a one or more primitives in screen space.

16. The system of claim 12, wherein said performing subsequent graphics operations on the second set of polygons includes:
performing primitive assembly on the tessellated vertex data to generate one or more primitives in screen space; and
performing scan conversion on the one or more primitives to determine which pixel or pixels of the plurality of pixels are part of corresponding primitives of the one or more primitives.

17. The system of claim 12, wherein said performing subsequent graphics operations on the second set of polygons includes:
performing primitive assembly on the tessellated vertex data to generate one or more primitives in screen space; and performing scan conversion on the one or more primitives to determine which pixel or pixels of the plurality of pixels are part of corresponding primitives of the one or more primitives; and
generating a finished frame by performing pixel processing to assign pixel values to the pixel or pixels that are part of the corresponding primitives.

18. The system of claim 12, wherein said performing subsequent graphics operations on the second set of polygons includes: performing primitive assembly on the tessellated vertex data to generate one or more primitives in screen space; and
performing scan conversion on the one or more primitives to determine which pixel or pixels of the plurality of pixels are part of corresponding primitives of the one or more primitives; and
generating a finished frame by performing pixel processing to assign pixel values to the pixel or pixels that are part of the corresponding primitives.

19. The system of claim 12, wherein the one or more regions are defined by an external signal.

20. The system of claim 19, wherein the external signal represents a location on the display device toward which a user's gaze is directed.

21. The system of claim 12, wherein the one or more regions include one or more portions of the screen space proximate a center of the screen space.

22. The system of claim 12, wherein performing subsequent graphics operations on the second set of polygons includes generating data corresponding a finished frame configured for presentation on the display device.

23. A non-transitory computer-readable medium having computer executable instructions embodied therein that, when executed, implement a method for graphics processing with a graphics processing system having a processing unit, the method comprising:
with the processing unit, performing a tessellation of a first set of polygons projected onto a screen space of a display device to divide the first set of polygons to produce a second set of polygons represented by tessellated vertex data, wherein the tessellated vertex data is characterized by a first density distribution of vertices in the one or more regions of the screen space and by a second density distribution of vertices in one or more remaining regions of the screen space, wherein the first and second density distribution at least depend upon a user proximity to the display device, wherein a minimum density for the second density distribution decreases when the user moves closer to the screen, wherein a maximum density for the first density distribution increases when the user moves closer to the screen, wherein the first density is higher than the second density, wherein the first density distribution of vertices follows a smooth limit surface and the second density distribution of vertices has a larger error tolerance than the first density distribution of vertices; and
with the processing unit, performing subsequent graphics operations on the second set of polygons.

* * * * *